United States Patent
Hirose et al.

(10) Patent No.: US 6,580,242 B2
(45) Date of Patent: Jun. 17, 2003

(54) ENTRAPMENT DETECTION DEVICE OF OPENING/CLOSING MEMBER

(75) Inventors: Kentaroh Hirose, Aichi-ken (JP); Kiyoshi Okamoto, Hekinan (JP); Hideharu Kato, Toyota (JP)

(73) Assignee: Aisin Seiki Kabushiki Kaisha, Aichi-Ken (JP)

( * ) Notice: Subject to any disclaimer, the term of this patent is extended or adjusted under 35 U.S.C. 154(b) by 120 days.

(21) Appl. No.: 09/940,500

(22) Filed: Aug. 29, 2001

(65) Prior Publication Data

US 2002/0024310 A1 Feb. 28, 2002

(30) Foreign Application Priority Data

Aug. 30, 2000 (JP) .......................... 2000-261789
Mar. 23, 2001 (JP) .......................... 2001-085485

(51) Int. Cl.⁷ .................... G05B 5/00; H02H 7/08; H02P 1/00; H02P 3/00; H02P 7/00
(52) U.S. Cl. ................ 318/445; 318/449; 318/265; 318/282; 318/286; 49/28
(58) Field of Search ................. 318/445, 449, 318/450, 468, 469, 120, 366, 256, 264, 265, 282, 286; 49/26, 28

(56) References Cited

U.S. PATENT DOCUMENTS

| | | | |
|---|---|---|---|
| 4,713,591 A | * 12/1987 | McCloskey | 318/257 |
| 5,436,539 A | * 7/1995 | Wrenbeck et al. | 318/265 |
| 5,917,299 A | * 6/1999 | Kumagai et al. | 318/466 |
| 6,034,495 A | * 3/2000 | Tamagawa et al. | 318/266 |
| 6,208,102 B1 | * 3/2001 | Kikuchi et al. | 318/466 |
| 6,452,353 B1 | * 9/2002 | Calamatas | 318/466 |
| 2002/0024308 A1 | * 2/2002 | Kato et al. | 318/445 |

FOREIGN PATENT DOCUMENTS

| | | | | |
|---|---|---|---|---|
| JP | H06-280446 | | 10/1994 | .......... E05F/15/10 |
| JP | H08-4419 | | 1/1996 | .......... E05F/15/16 |
| JP | H08-128259 | | 5/1996 | .......... E05F/15/10 |
| JP | 2000087647 A | * | 3/2000 | .......... E05F/15/10 |
| JP | 2000248835 A | * | 9/2000 | .......... E05F/15/10 |

* cited by examiner

Primary Examiner—Robert E. Nappi
Assistant Examiner—Edgardo San Martin
(74) Attorney, Agent, or Firm—Sughrue Mion, PLLC

(57) ABSTRACT

An entrapment detection device of an opening/closing member which efficiently performs an entrapment determination and restrains an entrapment load even when a motor rotational signal is not inputted. The entrapment detection device includes a controller for performing the entrapment detection based on detected motor rotational signal cycle changes outputted from a motor rotation sensor which is synchronized with the movement of a motor for actuating an opening/closing member. The controller stores the cycle changes of a predetermined number of output pulses from the sensor, predetermines a standard cycle time Tb from the stored pulse output, and calculates a cycle coefficient of the entrapment. When the motor rotational speed is reduced, an entrapment detection operation is performed by comparing a value of time from a previous cycle change to a current cycle change multiplied by the calculated cycle coefficient with the standard cycle Tb.

6 Claims, 14 Drawing Sheets

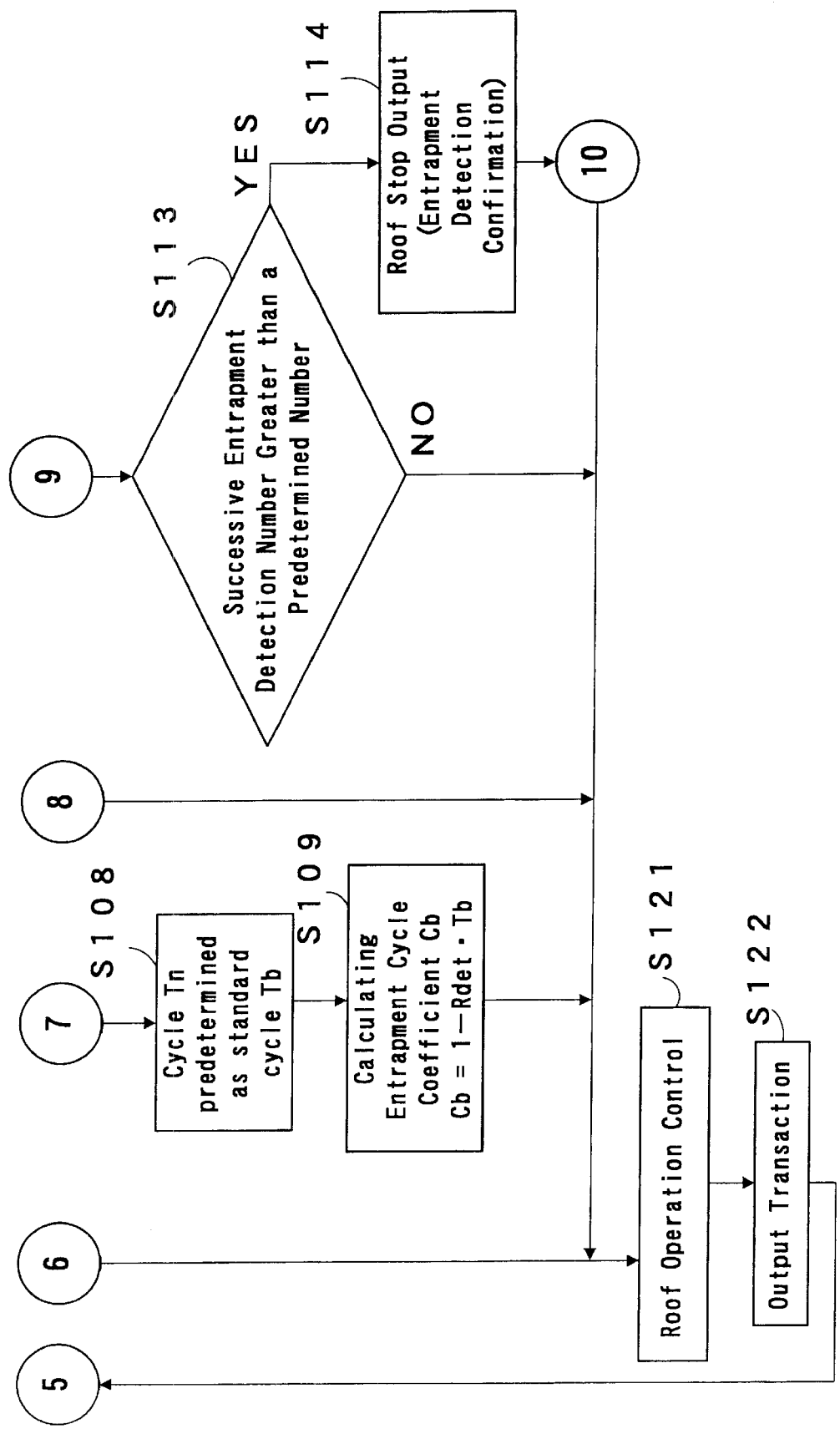
F I G. 4 (c)

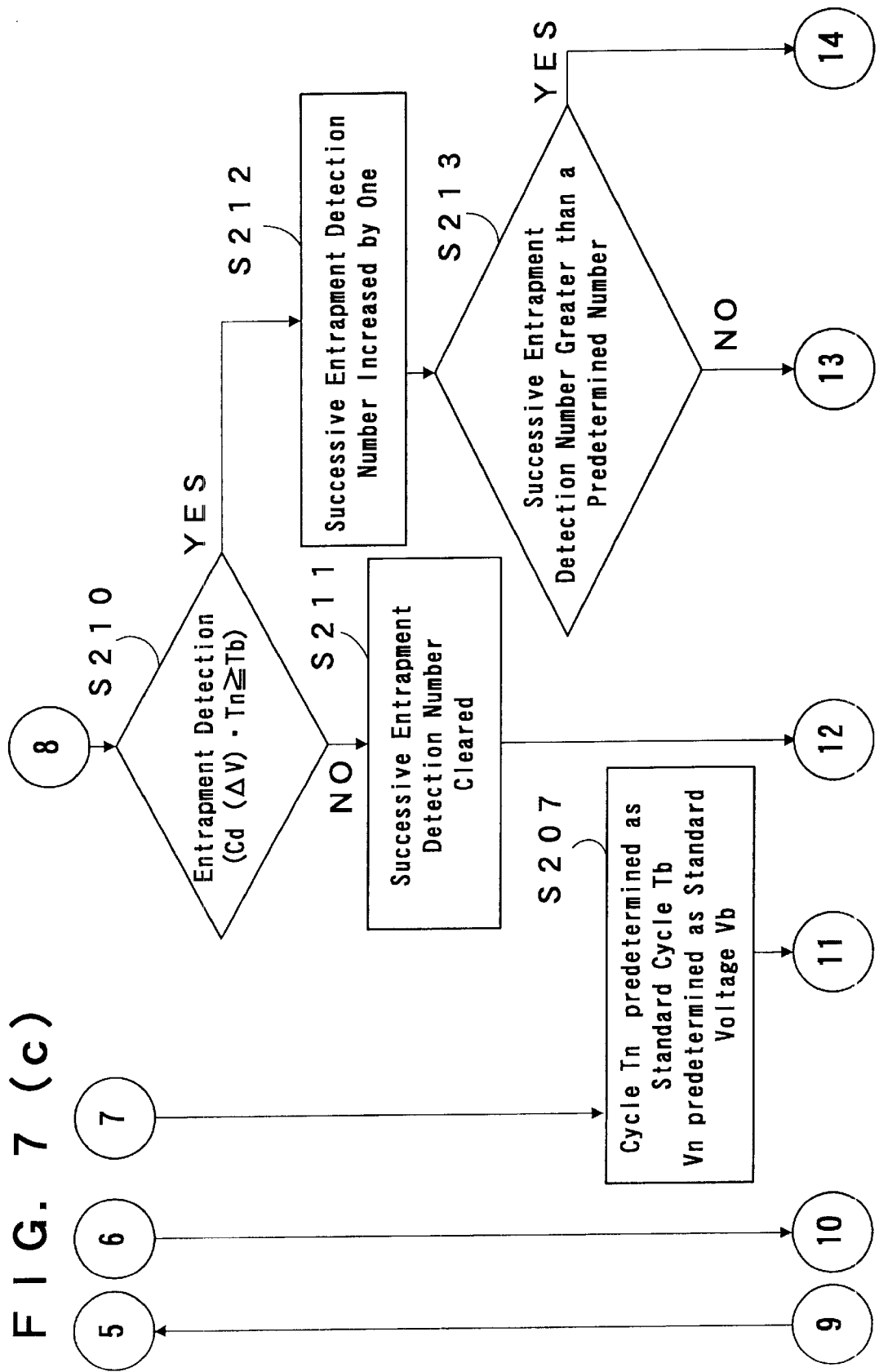

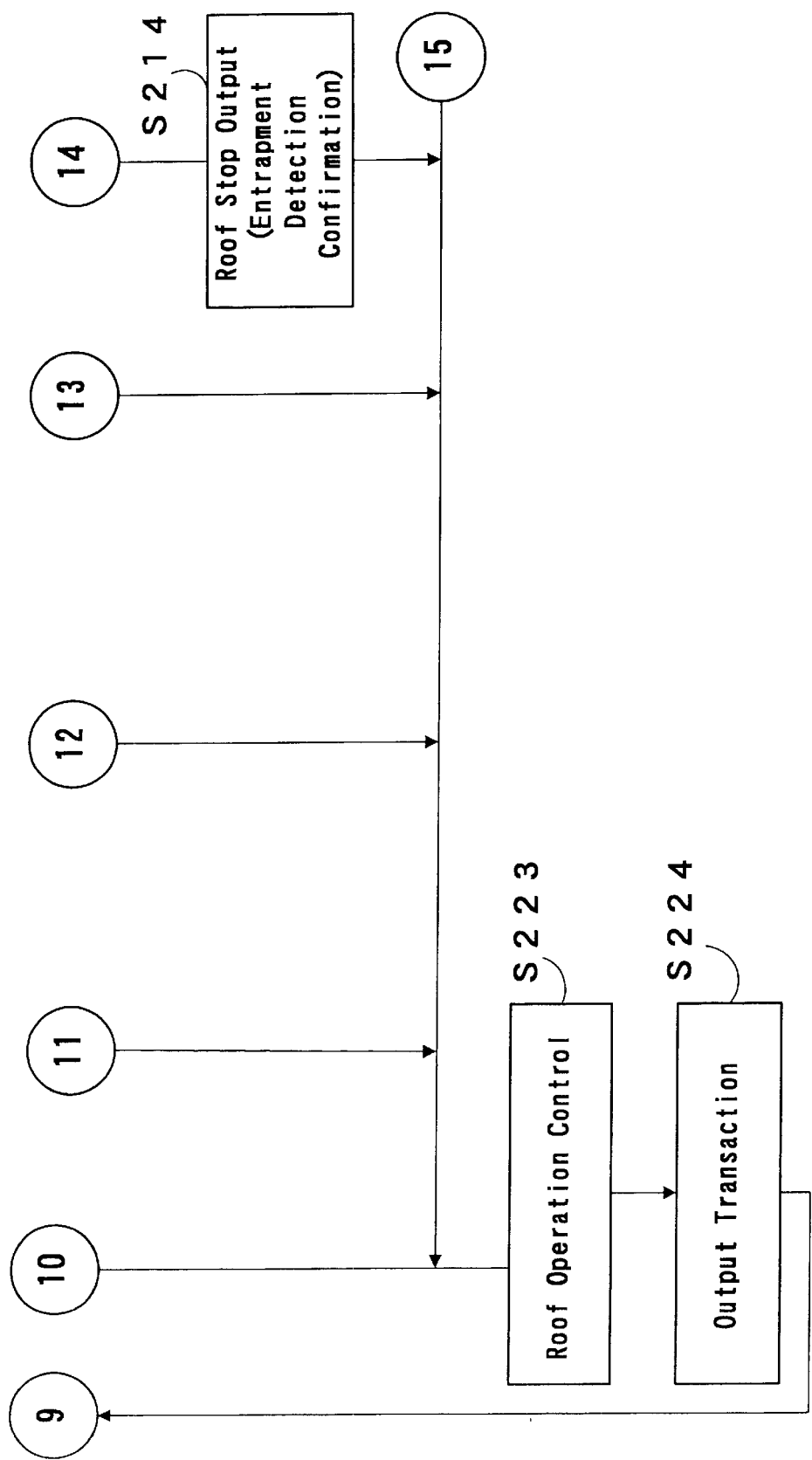

ENTRAPMENT DETECTION DEVICE OF OPENING/CLOSING MEMBER

This application is based on and claims priority under 35 U.S.C. §119 with respect to Japanese Applications No. 2000-261789 filed on Aug. 30, 2000 and No. 2001-085485 filed on Mar. 23, 2001, the entire content of which is incorporated herein by reference.

1. Field of the Invention

This invention generally relates to entrapment detection device. More particularly, the present invention pertains to entrapment detection device for an opening/closing member for opening and closing a fixed member and control thereof.

2. Background of the Invention

Recent vehicles including an opening/closing member such as a sunroof and wind regulators are generally provided with a safety mechanism. When the opening/closing member is operated by a motor, the safety mechanism detects entrapped objects or obstacles, stops the opening/closing member, and moves the opening/closing member in a reverse direction when the entrapment of the an object or obstacle is detected.

In known methods, the entrapment of obstacles is detected by the fluctuation of motor torque. A rotational condition of a motor for actuating the opening/closing member is detected by a rotation detecting sensor including a hall element. The entrapment is detected based on a pulse signal from the rotation detecting sensor.

Japanese Patent Laid-Open Publication No. H06-280446 discloses an opening/closing control device for judging the occurrence of the entrapment condition when a drive speed and a drive acceleration of the motor for opening/closing member operation is less than a predetermined threshold value determined based on a drive speed and the drive acceleration of the opening/closing member. The opening/closing control device detects the rotation of the motor for actuating a power window by a motor position detecting sensor and calculates a motor rotation speed and a motor rotation acceleration. The opening/closing control device performs feedback/reverse control by comparing the motor rotation speed with a speed threshold value when a motor rotation speed change is regular. Alternatively, the opening/closing control device performs reverse control by comparing the motor rotation acceleration with an acceleration threshold value when the motor rotation speed change is not regular.

Japanese Patent Laid-Open Publication No. H08-4416 discloses an entrapment prevention device which detects the entrapment of obstacles when a window pane is at a position range at which the pane possibly causes an entrapment, when the relative speed is greater than a predetermined value, when a number of successive speed changes occur while closing the pane, and a total of each amount of speed change is greater than a predetermined value. In the entrapment prevention device, a motor rotational condition for actuating the pane is obtained in the following manner. An edge interval time Tn is detected by sensing a time interval of the pulse signal, angular speed component data Fn is obtained from the inverse of the edge interval time (Fn=1/Tn), electric voltage correction data and a relative speed Vn are obtained, and the total relative speed DVn is calculated. When the total relative speed DVn is greater than a predetermined value, an entrapment condition is determined to exist.

Japanese Patent Laid-Open Publication No. H08-128259 discloses a window opening/closing control device for judging whether obstacles are entrapped by predetermining a threshold value for judging whether obstacles are entrapped based on a cycle (period) corresponding to an output interval of the pulse signal from the hall element during the closing operation of the window. The window opening/closing control device reads the cycle of the pulse signal of a sensor for detecting the rotation of the motor for driving window within the range within which entrapment possibly occurs. The window opening/closing control device further identifies the relationship between a cycle range $\Delta Ti$, and a threshold value (mi) from a map, calculates a pulse signal cycle differentiation , and detects the entrapment of the obstacles by the pulse signal cycle differentiation .

However, the known devices disclosed in the Japanese Patent Laid-Open Publication H06-280446 and the Japanese Patent Laid-Open Publication H08-4416 are required to obtain the rotational speed of the motor. In order to obtain the rotational speed of the motor, the aforementioned known devices are required to perform a division operation in the process of the calculation of the reciprocal of the pulse cycle. Generally, the division operation requires a longer calculation time compared to addition, subtraction, and multiplication operations. This increases the size of the program. Because entrapment is judged after considering the rotation cycle and performing the calculation in the controller, it takes time for judging the entrapment after detecting the data of entrapment.

If it takes time to determine an entrapment condition when the rotational speed of the motor suddenly decreases and when the entrapment occurs such as the case that a hard object is entrapped, the entrapment load (load on the entrapping member) is increased. Further, when the pulse output is not inputted into the controller from a sensor, such as when the sensor for detecting the rotation of the motor is damaged, judgment of the entrapment cannot be performed.

In the known method in which a map is used at the judgment of the entrapment is disclosed in the Japanese Patent Laid-Open Publication No. H08-128259, the information necessary for the judgment of the entrapment needs to be memorized (stored in memory) previously, which increases a memory size.

Therefore, a need exists for an entrapment detection device of an opening/closing member which quickly determines entrapment without using a division operation necessary for calculating the motor rotational speed at the judgment of the entrapment.

SUMMARY OF THE INVENTION

According to one aspect of the invention, an entrapment detection device of an opening/closing member includes a motor for actuating the opening/closing member, a detecting means for outputting a pulse synchronized to movement of the motor, and a control means for performing an entrapment detection during an operation of the opening/closing member based on a change of the pulse output from the detecting means. The control means memorizes (stores in memory) a change of the pulse output of a predetermined number of pulses, predetermines a standard cycle, Tb, from the memorized pulse output, calculates a cycle coefficient, Cb, for a cycle in which no entrapment is detected based on the standard cycle Tb, and performs an entrapment confirmation by comparing a multiplied value based on the cycle coefficient Cb, the latest cycle interval time Tn and the standard cycle Tb.

According to another aspect of the invention, an entrapment detection device of an opening/closing member includes a motor for actuating the opening/closing member, a detecting means for outputting a pulse synchronized to movement of the motor, and a control means for performing an entrapment detection during an operation of the opening/closing member based on a change of the pulse output from the detecting means. The control means memorizes output changes of the pulse output, obtains the latest cycle interval time Tn, predetermines a standard cycle Tb from an output pulse several pulses before, calculates a cycle coefficient Cb based on the standard cycle Th, and performs an entrapment confirmation when a multiplied value based on the cycle coefficient Cb and the cycle interval time Tn is greater than the standard cycle Tb.

BRIEF DESCRIPTION OF THE FIGURE DRAWINGS

The foregoing and additional features and characteristics of the present invention will become more apparent from the following detailed description considered with reference to the accompanying drawing figures in which like reference numerals designate like elements and wherein.

Figure 2:
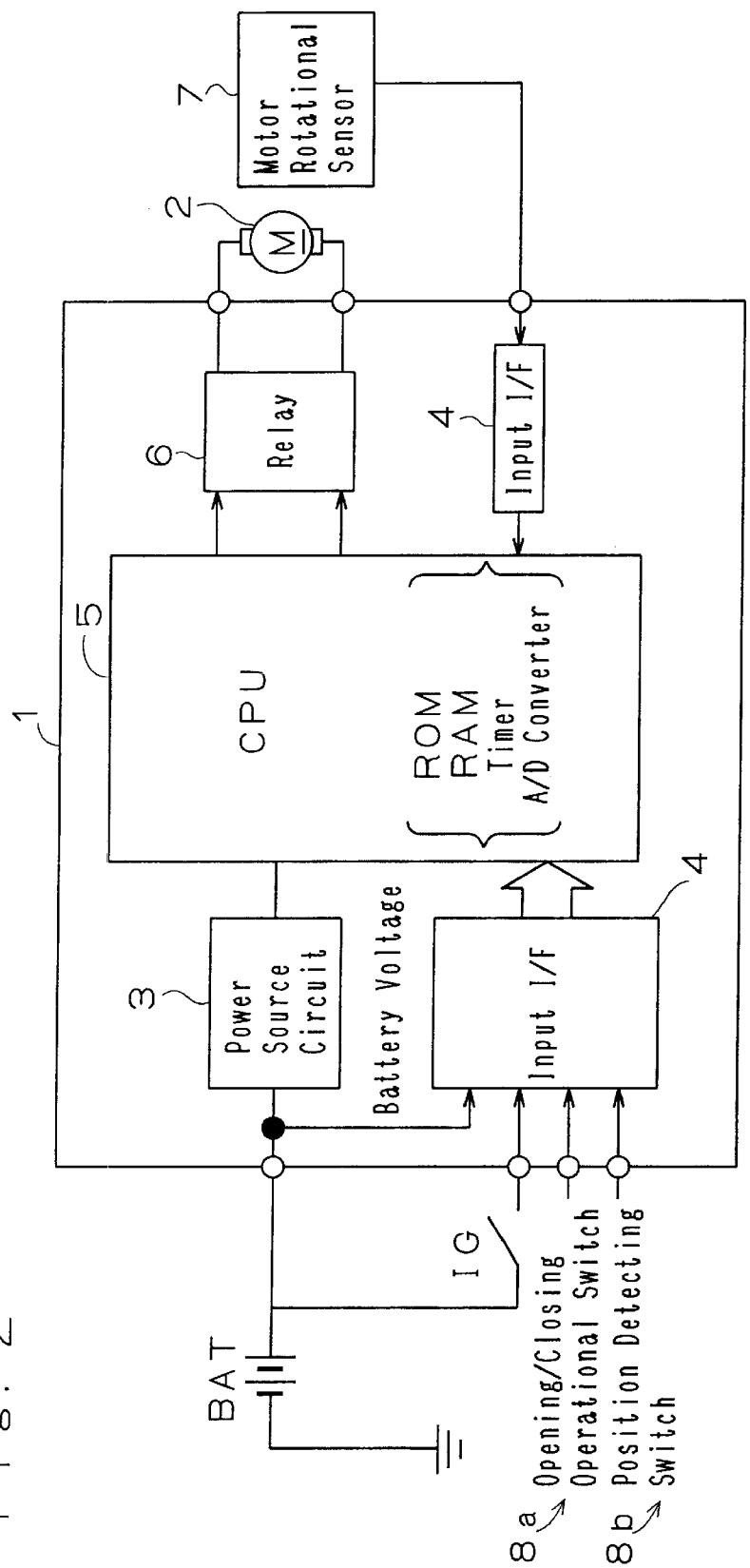
FIG. 2 is a system diagram of the sunroof device according to FIG. 1.
Figure 5:
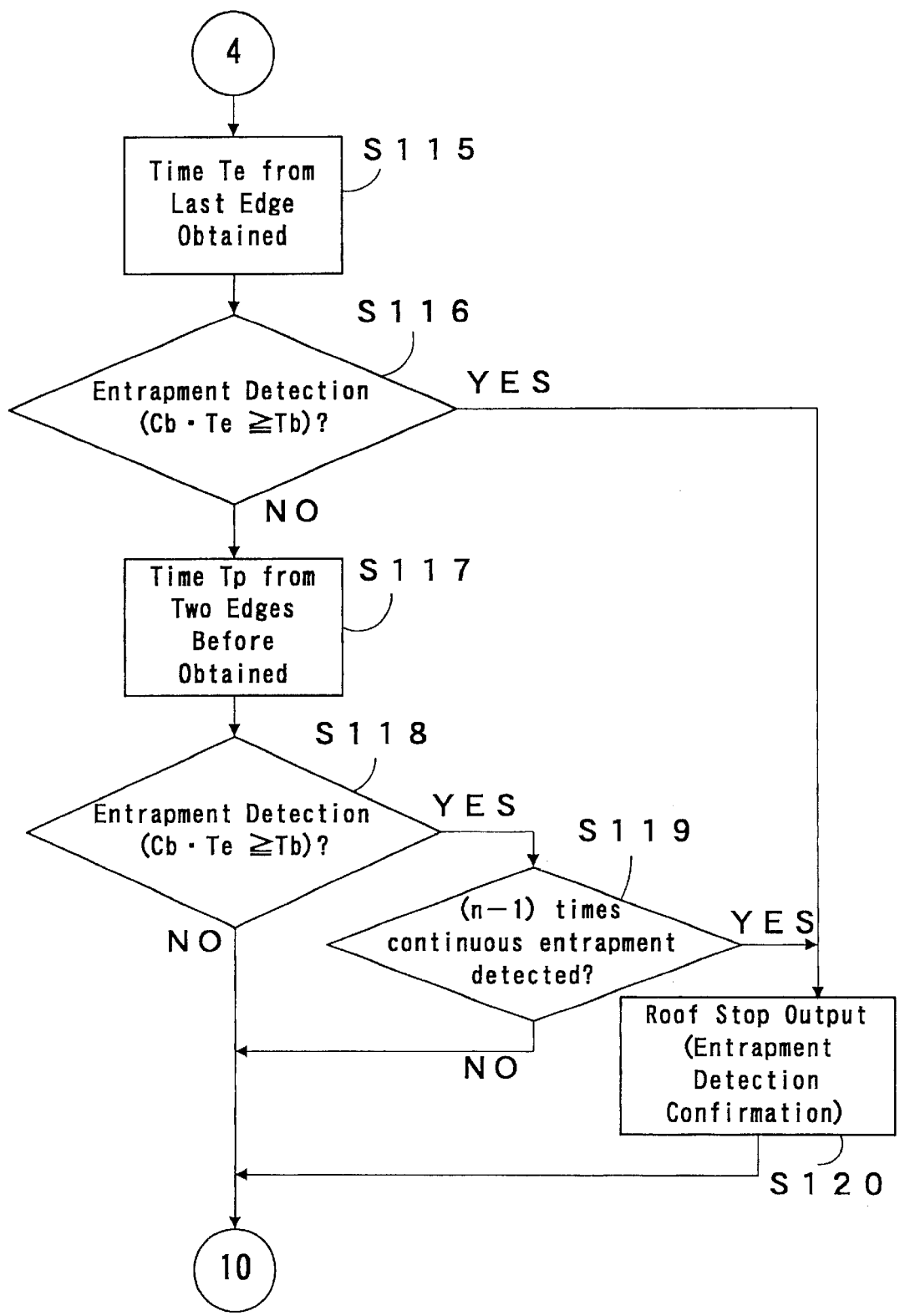
Figure 6:
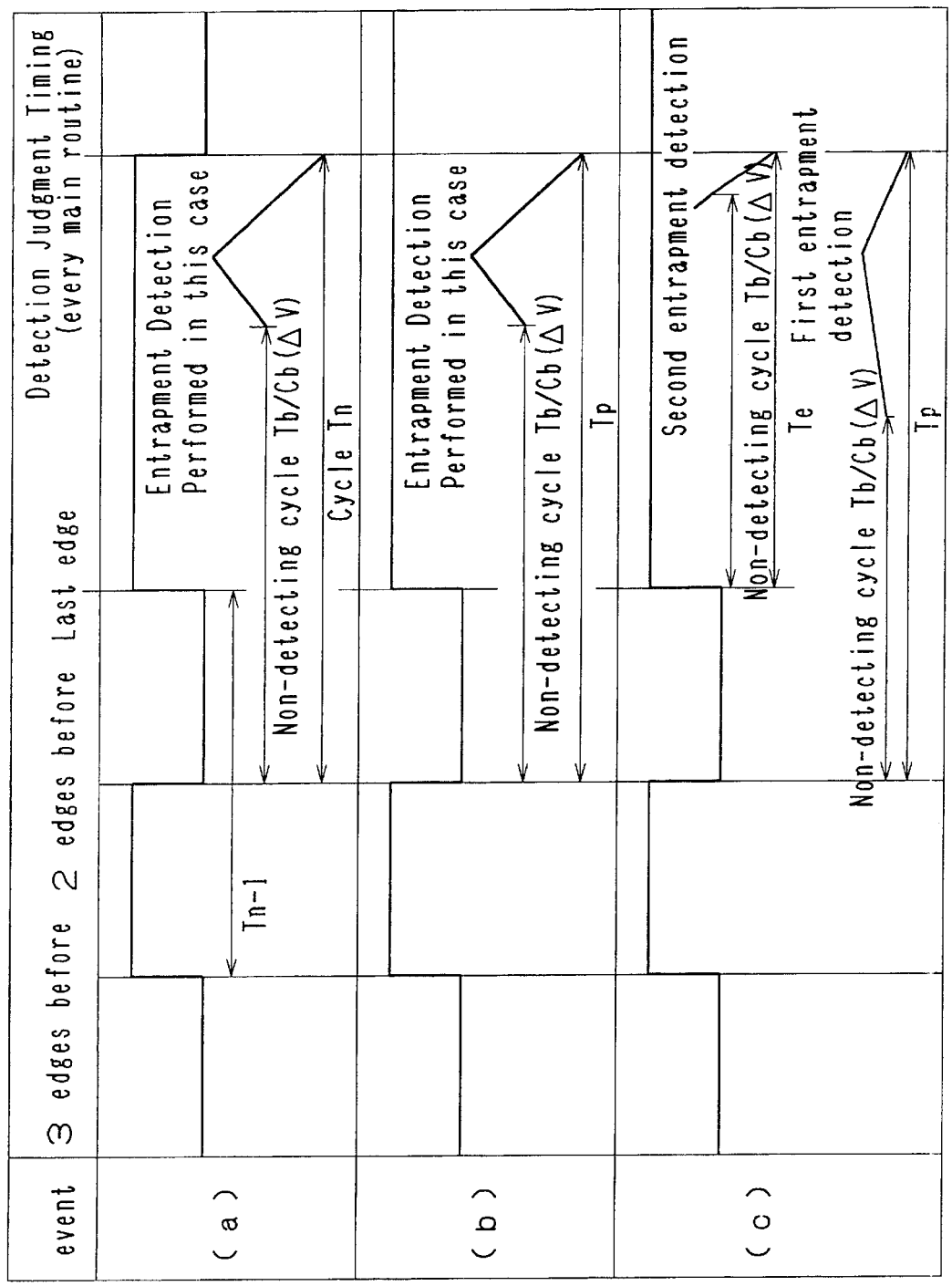
Figure 8:
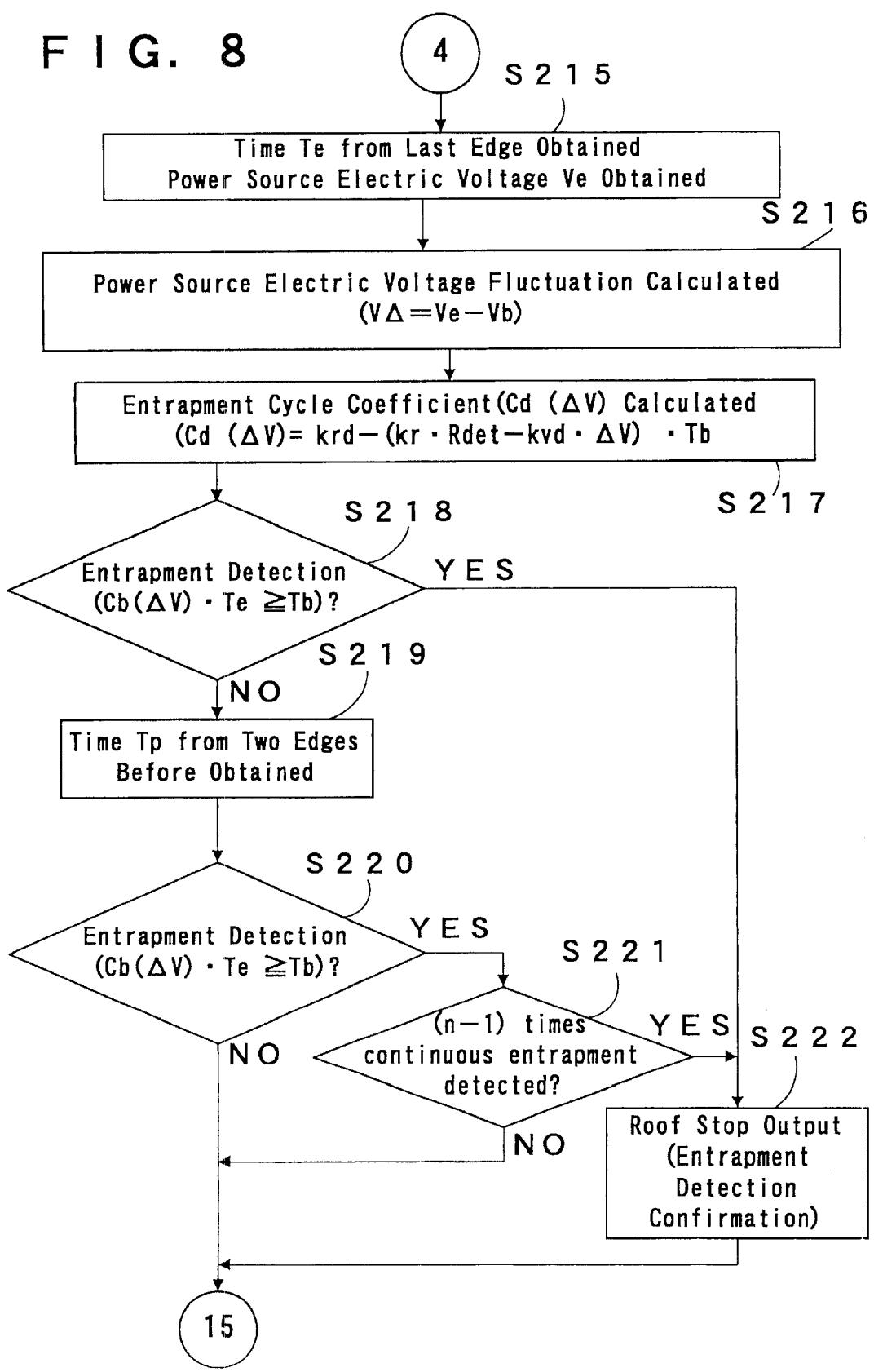

FIGS. 4(a)–(c) is a flowchart for a controller according to FIG. 2;

FIG. 5 is a flowchart for a controller according to FIG. 2;

FIG. 6 is an explanatory view of the entrapment detection judgment based on the cycle data of the pulse signal outputted from the motor rotation sensor according to a second embodiment of the present invention;

FIGS. 7(a)–(d) is a flowchart for the second embodiment;

FIG. 8 is a flowchart for the second embodiment; and

Figure 9:
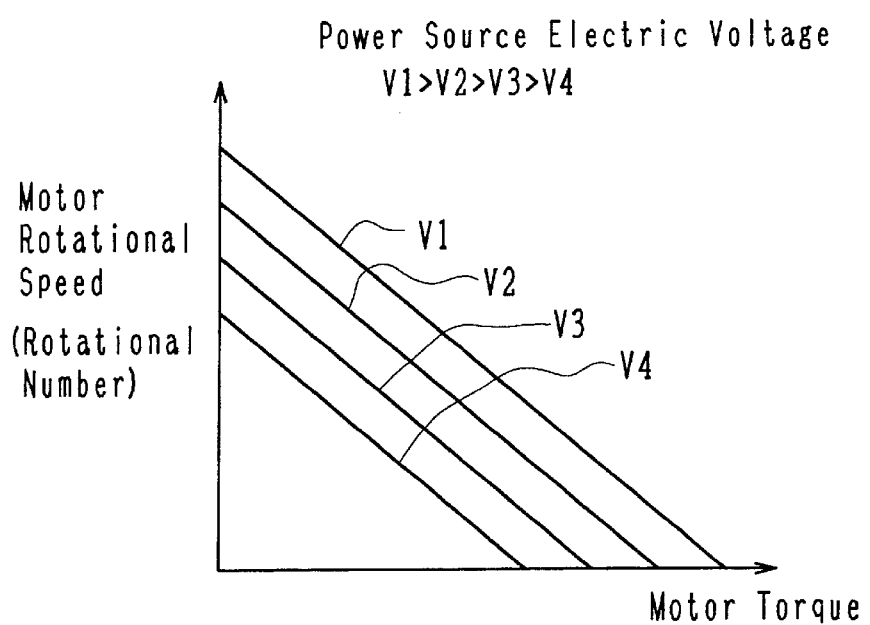

FIG. 9 is a graph illustrating a relationship between a motor generation torque and a motor rotational speed in accordance with a power source voltage.

DETAILED DESCRIPTION OF THE INVENTION

A first embodiment of the present invention will be explained referring to drawings.

Although an entrapment detection device applied to a sunroof device will be explained in the first embodiment of the present invention, the usage of the entrapment detection device is not limited. For example, the entrapment detection device is applicable to a power window regulator device for lifting and lowering a vehicle window, a roof opening/closing controlling device for opening the compartment or tilting the roof cover for vehicles, and an automatically operated door device for buildings.

Figure 1:
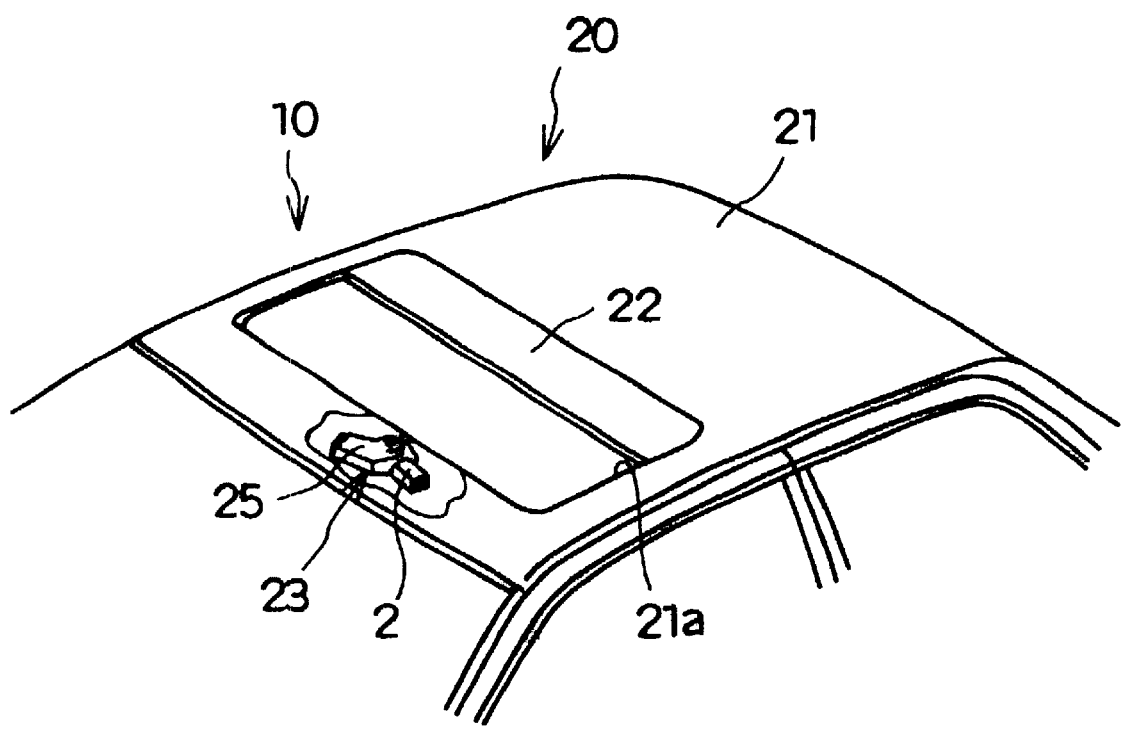
FIG. 1 is a perspective view of an entrapment detection device of opening/closing member according to a first embodiment of the present invention applied to a vehicle sunroof device.

FIG. 1 shows a sunroof 10 of a vehicle 20. A roof 21 of the vehicle 20 is provided with a rectangular opening 21a and a roof pane 22 corresponding to an opening/closing member for covering the opening 21a. The roof pane 22 is slidable in a fore-and-aft direction of the vehicle by a known sliding mechanism and is tilted in upward-downward direction by a known tilt mechanism.

A drive unit 23 for actuating the roof pane 22 is housed, for example, in a front portion of the roof 21, near the opening 21a. The drive unit 23 includes a motor 2 and a gear unit 25 connected with one another. An output shaft of the gear unit 25 is operatively connected to the sliding mechanism and the tilt mechanism. When the motor 2 is actuated by a controller 1 shown in FIG. 2, the sliding operation and the tilt operation of the roof pane 22 may be activated.

FIG. 2 is a system diagram of a controller 1 of the sunroof device 10. The controller 1 actuates the roof pane 22, and controls the opening/closing operation of the roof pane 22. The controller 1 receives a signal from opening/closing operational switch 8a and a position detecting switch 8b for detecting the position of the roof pane 22 and determines the condition (sunroof position) based on the signal. In response to the drive signal outputted from the controller 1 to the motor 2, the roof pane 22 is operated. When an obstacle such as limb or another object is entrapped between the roof pane 22 and the opening 21a of the vehicle in the sunroof device 10, the rotation of the motor 2 inhibited, which reduces the rotational speed thereof. The detection of the entrapment is performed using this characteristic that the rotational speed of the motor is reduced. Accordingly, the closing operation of the roof pane 22 is immediately stopped at the detection of the entrapment and reverse operation for opening the roof pane 22 is performed by the entrapment detection mechanism so as to ensure the safety of the vehicle occupants.

The controller 1 includes CPU 5 which may include a ROM, a RAM, and a timer, an input interface (i.e., I/F) 4, a relay 6, and an power source circuit 3. The ROM may store a program therein. The RAM may store numerical values necessary for program operation. The timer measures pulse cycle from a motor rotation sensor 7 which outputs the pulse output signal synchronized to the motor rotation. The CPU 5 also includes an A/D converter for converting an analogue value of inputted battery electric voltage into a digital value. The input I/F 4 achieves a compatibility between the CPU 5 and the inputted pulse signals. The relay 6 regulates the rotational direction of the motor 2 allowing the motor to rotate in an opening or a closing direction. The motor 2 having a function to operate the roof pane 22 in opening/closing direction during sliding operation. The power source circuit 3 generates stable constant electric voltage (for example 5V). The constant electric voltage generated in the power source circuit 3 is supplied to the CPU 5. The input I/F 4 of the controller 1 is supplied with the battery electric voltage.

The controller 1 receives an input pulse signal from the motor rotational sensor 7, a signal from the position detecting switch 8b, and a signal from an opening/closing operational switch 8a. The motor rotation sensor 7 detects a cycle signal (of one pulse per one rotation of a magnet (not shown) (for example, a magnet having a N pole and a S pole is provided) provided on the output shaft of the motor 2) from a hall element. The position detecting switch 8b detects the position of the roof pane 22. The manually operated opening/closing operational switch 8a opens and closes the roof pane 22. The input pulse signals are inputted to the CPU 5 through the input I/F circuit 4, and the battery (BAT) electric voltage is input to the CPU 5 through the input I/F 4 in the controller 1. The pulse signal from the motor rotation sensor 7 cycles between ON and OFF (high and low) synchronized with the motor rotation and the alternating pulse output is input into the CPU 5. The CPU 5 compares the level of the inputted pulse signals from the motor rotation sensor 7, and accordingly detects the edge of the pulse signals.

The CPU 5 outputs a signal to the relay 6 for actuating the motor 2 based on the input pulse signals from the motor rotation sensor 7, the position detecting switch 8b, and the opening/closing operational switch 8a. The CPU 5 controls the stop, and rotational direction of the motor 2 by switching the energization condition and the energization direction of the relay 6.

Figure 3:
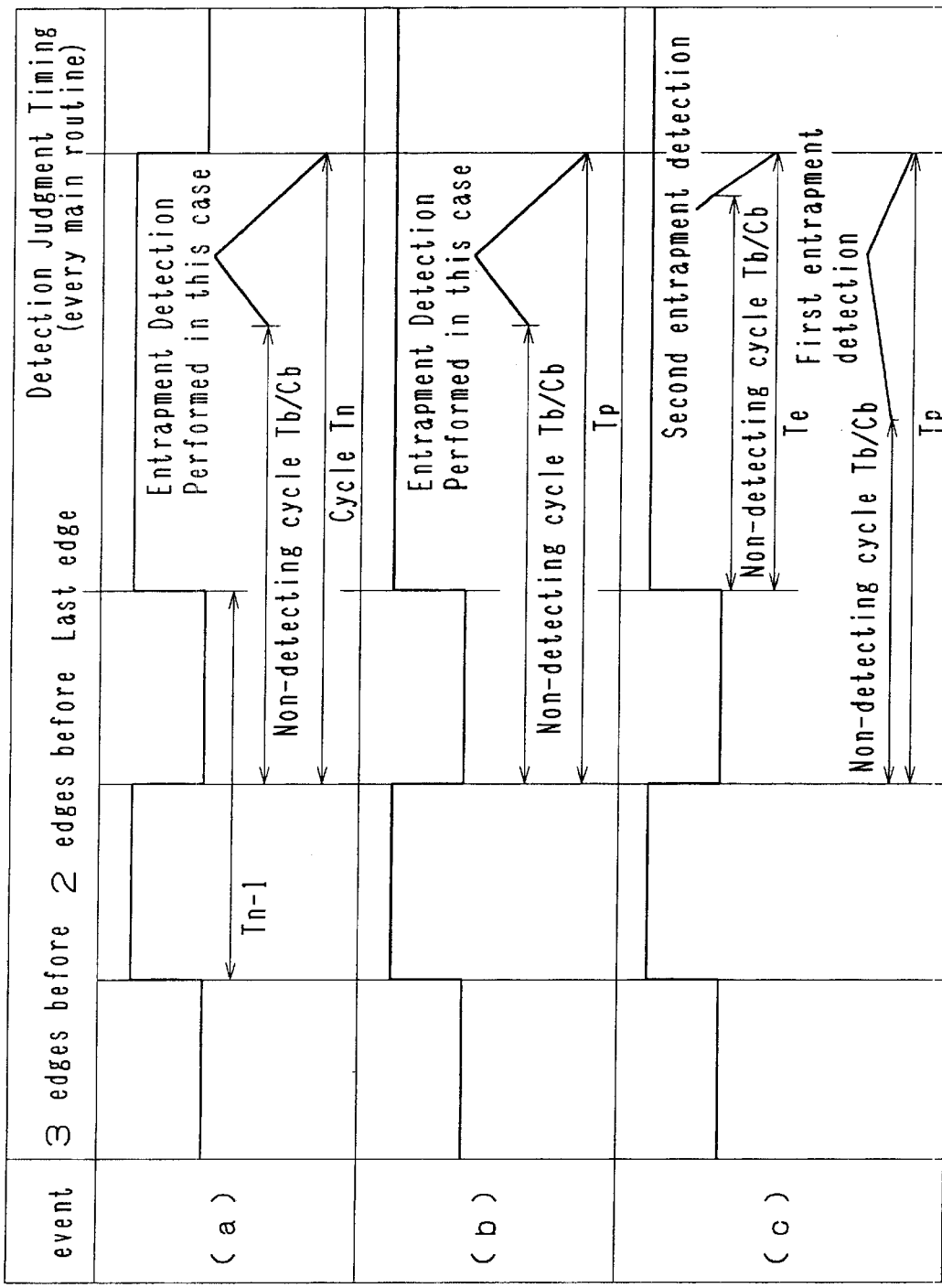
FIG. 3 is an explanatory illustration of the entrapment detection determination process based on the cycle data of the pulse signal output from the motor rotation sensor shown in FIG. 2.

The entrapment detection determination based on the pulse signal from the motor rotation sensor 7 will be explained with respect to FIG. 3. Three different entrapment determination examples are shown in FIG. 3. FIG. 3(a) illustrates a determination based on cycle data when the pulse signal output (edge change) is continuously generated from the motor rotation sensor 7. In this case, since high potential (High) pulse signal output and low potential (Low) pulse signal output are alternatively generated from the motor rotation sensor 7, a latest cycle interval time Tn of the pulse signal of the motor rotation sensor 7 can be obtained referring to a time interval from two edges before to the latest edge (i.e., detecting the direction of the current cycle period). Using the value of the cycle interval time Tn, and the standard cycle time Tb the entrapment detection judgment is determined.

The Standard cycle Tb will be explained as follows. Normally, the motor 2 exhibits a negative correlation with respect to motor rotational speed and motor generated torque (for example, generally the faster the motor rotational speed becomes, the smaller the torque generated by the motor becomes, on the other hand, the slower the motor rotational speed becomes, the larger the motor generated torque becomes) when the electric voltage for actuating the motor 2 is constant in relation between the motor generation torque and the motor rotational speed.

The current torque generated in the motor 2 is predetermined as Fn, standardized motor generated torque is predetermined as Fb, and the torque generation differential is predetermined as $\Delta F(=Fn-Fb)$. Further, the current motor rotational speed is predetermined as Rn and the motor rotational speed at the generation of the torque Fb is predetermined as Rb. In the foregoing case, due to the negative correlation between the motor rotational speed and the torque, the following formula is obtained.

$$\{Fn-Fb\}/\{Rb-Rn\}=kr \text{ (constant)}.$$

By applying $\Delta R=\{Rb-Rn\}$, the following is obtained.

$$\Delta F=Fn-Fb=kr\times\Delta R \quad \text{(i.e., formula 1)}$$

When the cycle interval of the motor rotation relative to the motor rotational speed (Rb, Rn) is determined as Tb, Tn respectively, the following relations are obtained.

$$Rb=\{1/Tb\}, Rn=\{1/Tn\}$$

Thus, the following is obtained.

$$\Delta R=\{1/Tb\}-\{1/Tn\}$$

Accordingly, the point at which the rotational speed fluctuation shows the torque fluctuation needs to be detected, this rotational speed is determined as Rdet. It is assumed that the load fluctuation which needs to be detected is generated when $\Delta R (=\{1/Tb\}-\{1/Tn\})$ satisfies the condition of $Rdet \leq \Delta R$. By multiplying $Tb \cdot Tn$ on both sides of $Rdet \leq \Delta R$, the following can be obtained.

$$Rdet \cdot Tb \cdot Tn \leq 1 \cdot (Tn-Tb)$$

This is transformed to $Tn \geq Tb/\{1-Rdet \cdot Tb\}$. When $Cb=\{1-Rdet \cdot Tb\}$ is applied, $Tn \geq Tb/Cb$ can be obtained (formula 2).

Thus, Tb/Cb represents a cycle when the cycle duration fluctuates by Rdet from the standardized cycle time Tb. When the current cycle interval time Tn becomes greater than the cycle time Tb/Cb, it is determined that the load fluctuation needs to be detected. Hereinafter, Tb/Cb is called a non-detecting cycle. Since the formula 2 includes division, it is transformed to $Tn \cdot Cb \geq Tb$ (formula 3). Wherein the product of the current cycle interval time Tn and Cb becomes greater than Tb, it is determined that the load fluctuation needs to be detected. That is, it is judged that the entrapment condition exists when the value of cycle interval time Tn becomes greater than the value of the non-detecting cycle (Tb/Cb).

FIG. 3(b) illustrates an entrapment determination based on cycle data when an expected edge change does not occur in the pulse signal output from the motor rotation sensor signal 7. In this case, a passage of time from two edges before to the current time is determined as Tp. By using the passage of time Tp, the entrapment detection judgment is performed. The passage of time Tp corresponds to the current signal cycle time. The occurrence of the entrapment is judged when the value of the passage of time Tp corresponding to the present cycle becomes greater than the value of the non-detecting cycle Tb/Cb. Accordingly, even when the edge change of the pulse signal from the motor rotation sensor 7 is stopped for some reason, for example, by the change of the cycle due to a sudden load change, the entrapment detection judgment is performed relative to the non-detecting cycle (Tb/Cb), thus the entrapment detection can be performed at stable load.

When using a filter for judging the occurrence of the entrapment by detecting an entrapment condition occurring a predetermined number of times (for example twice) in order to prevent the misjudgment of the entrapment at the entrapment detection judgment, the accurate and early entrapment detection cannot be performed because the second edge having similar characteristics needs to be observed even if the sudden load change is generated.

FIG. 3(c) explains the entrapment judgment relative to the cycle data of this embodiment when early judgment of the entrapment detection is performed and illustrates an entrapment determination based on cycle data wherein the edge change of the pulse signal from the motor rotation sensor 7 is stopped. A passage of time from the last edge to the present is determined as Te. The passage of time Te corresponds to the current edge width. As shown in FIG. 3(c), the occurrence of the entrapment is judged when Tp corresponding to the cycle or the value of the Te corresponding to the edge width becomes greater than the value of the non-detecting cycle (Tb/Cb). In addition, the entrapment detection judgment can be performed relative to the non-detecting cycle (Tb/Cb) even when the edge is not inputted into the controller 1 by determining the non-detecting time of the pulse edge with respect to the non-detecting cycle (Tb/Cb) by the introduction of Te (i.e., time range until the occurrence of the entrapment is judged). Accordingly, when the filter for preventing the misjudgment of the entrapment is predetermined to require entrapment to occur twice, the cycle from the two edges before is used in a first entrapment determination for detection of Tp and a cycle corresponding to the last edge is used in a second entrapment determination for detection of Te. Accordingly, the early judgment for preventing the misjudgment of an entrapment condition can be performed and the entrapment load can be quickly restrained.

Thus, even when the edge is not inputted from the motor rotation sensor 7 and even when the entrapment detection is not confirmed because the edge change is not detected during the detection process, the entrapment detection judgment relative to the non-detecting cycle (Tb/Cb) can be achieved faster than as shown in FIG. 3(b) using Te. Further, the entrapment detection can be confirmed with less entrapment load compared to (b).

Figure 4:
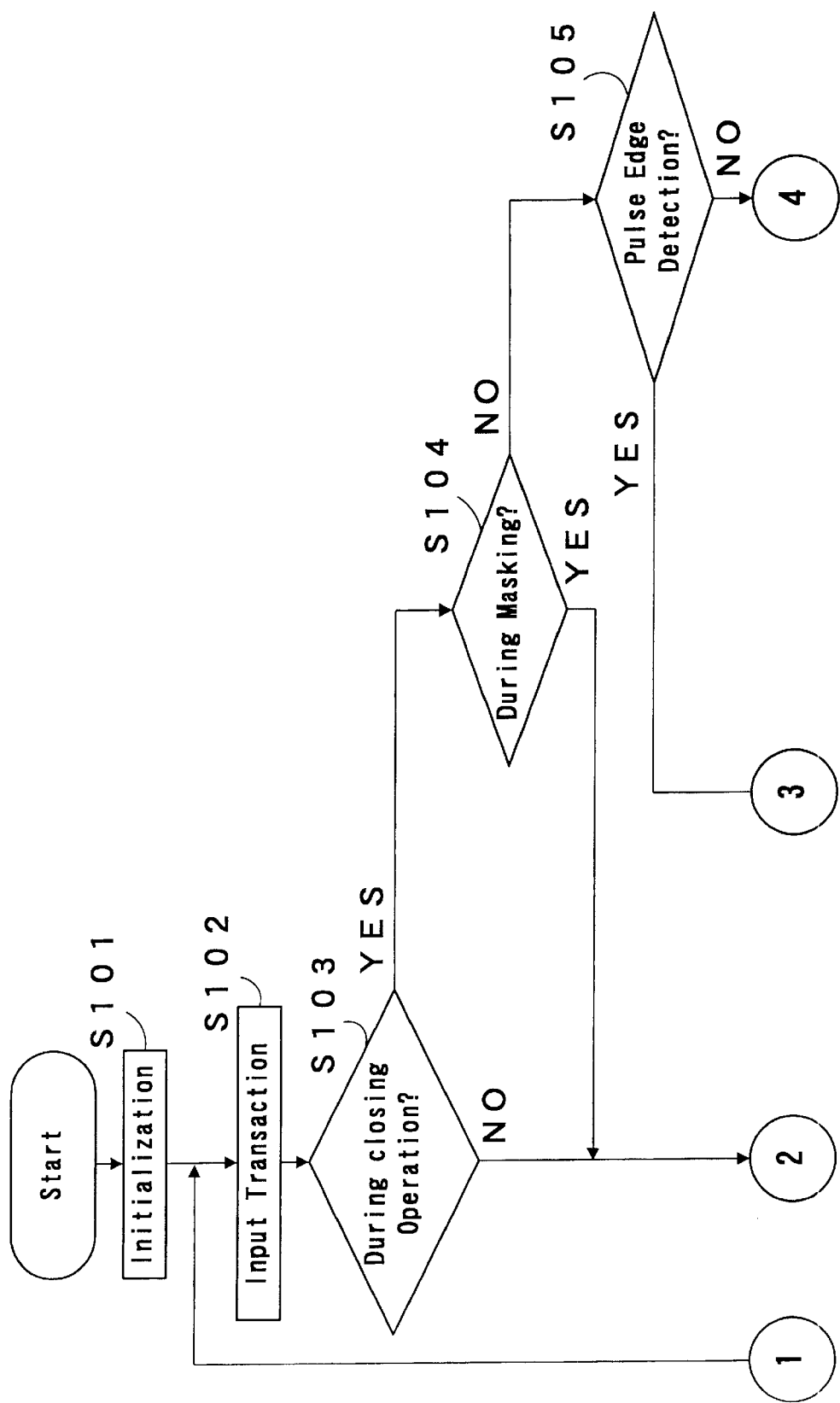
Figure 4:
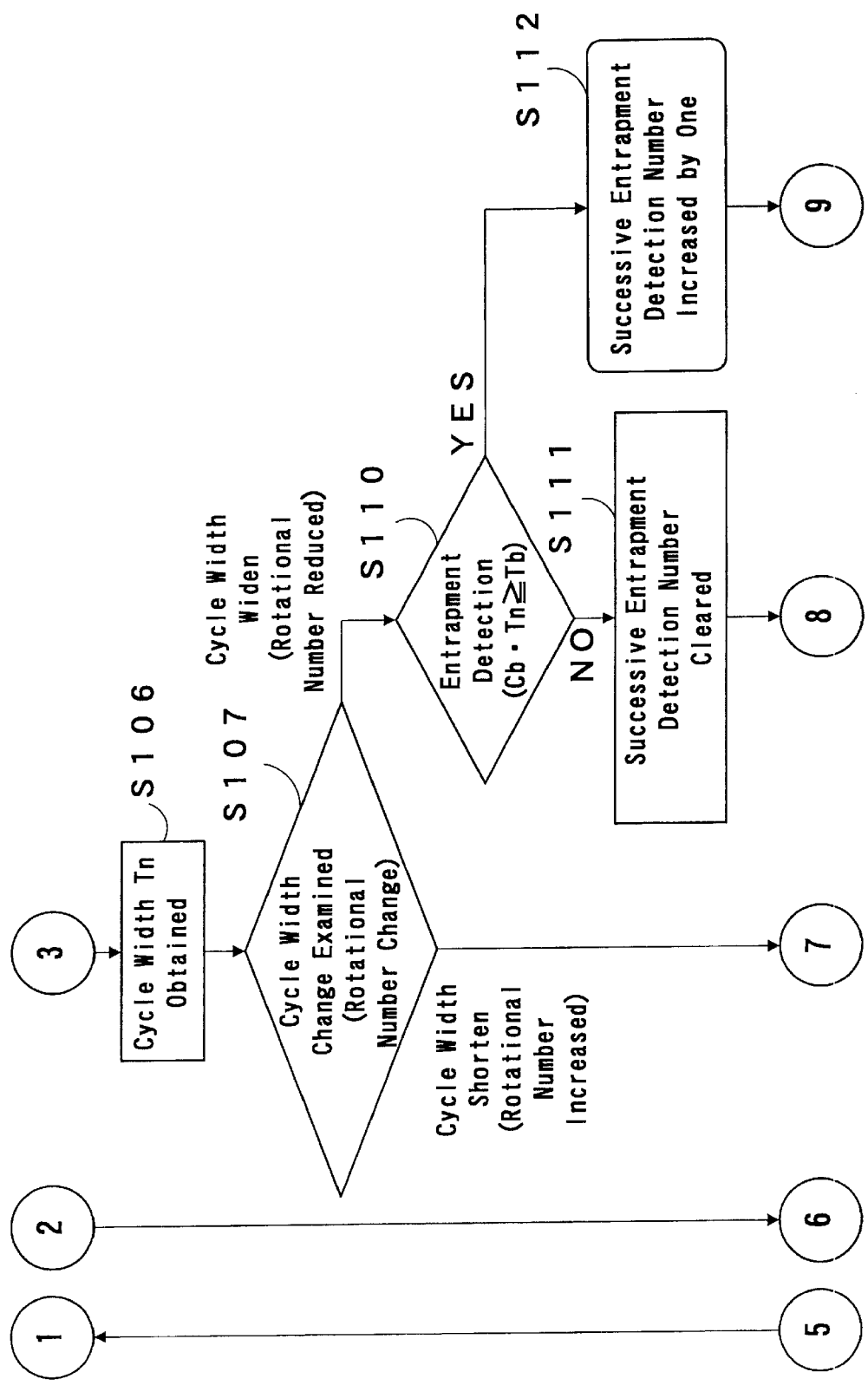

Referring to FIGS. 4, 5 an entrapment judgment (determination) procedure of the controller 1 according to the first embodiment will be explained.

When the electric source is supplied to the controller 1, the controller 1 carries out the program stored in the ROM of the CPU. First, in Step S101, the sunroof device 10 is initialized. In the initialization, a condition of the CPU is setup, memories corresponding to ROM and RAM are checked, input and output ports are setup, and a timer for measuring pulse signal cycle duration is initialized. A main routine including operations from Step S102 to Step S122 is carried out within a predetermined cycle. In this case, the cycle of the main routine is predetermined to be adequately shorter than the edge width of the input pulse signal of the motor rotation sensor 7.

In Step S102, the input transaction (operation) to the CPU 5 is performed. The signals inputted into the controller 1 (i.e., the signal from the opening/closing operation switch 8a, position detecting switch 8b, the pulse signal from the motor rotation sensor 7, and the electric voltage signal from the power source circuit 3) are inputted into the CPU 5 to be stored in required allocated memory. In Step S103, it is determined whether the operational condition of the roof pane 22 is within the parameters for detecting the entrapment. That is, the entrapment detection is not transacted when the roof pane 22 is moved in an opening direction and the transaction is advanced to Step S121. On the other hand, when the roof pane 22 is moved in a closing direction, the entrapment detection operation after Step S104 is performed.

In Step S104, it is judged whether the current rotational condition of the motor 2 is stable. In this case, an unstable condition of the motor rotation from start of the energization until passing a predetermined time is determined as a transient state. In order to avoid wrongly detecting the change of the rotational pulse speed of the motor 2 during the transient state as an entrapment condition, the entrapment detection determination is not performed during the transient state. The entrapment detection determination is made after the motor rotation is stabilized. Accordingly, when it is judged that the motor rotational condition is at transient state (i.e., during masking) in Step S104, the transaction is advanced to Step S121. When the motor rotation is stabilized after the transient state, the transaction is advanced to Step S105 for judging the entrapment condition.

In Step S105 it is determined whether the edge change of the pulse signal outputted from the motor rotation sensor 7 has occurred (i.e., whether the edge change is inputted into the CPU 5). According to whether the edge change has occurred, the conditions of the entrapment determination operation are categorized, this reduces the transaction time for carrying out the main routine. When the edge change (i.e., pulse edge) of the pulse signal from the motor rotation sensor 7 is detected in Step S105, the transaction is advanced to Step S106. When the edge is not detected, the transaction is advanced to Step S115.

With reference to FIG. 4(b), in Step S106, the cycle interval time Tn of the pulse signal from the motor rotation sensor 7 is obtained (detected) and saved in the memory (RAM). The cycle interval time Tn is determined to be a time between two successive rising edges when the present edge is detected during rising of the pulse signal. The cycle interval time Tn is determined between two successive falling edges when the present edge is detected during falling of the pulse signal. The CPU 5 obtains the cycle interval time Tn every time the edge of the pulse signal is generated based on the change of the pulse output, and saves this pulse cycle data for a predetermined period (e.g., data during the period that either six rising edges or falling edges are inputted). That is, in order to observe the cycle change, a cycle change for a pulse cycle occurring predetermined number of pulse cycles before the present cycle is compared to the cycle interval time Tn of the present cycle. In order to obtain the cycle interval time Tn, the value of the timer for measuring the cycle by counting every time the edge is detected is saved on RAM as the cycle interval time Tn. After obtaining the cycle interval time Tn, the value of the timer for measuring the cycle is cleared. Data of cycle Tn-6 occurring six edges before the present cycle (shown with a pointer when obtaining the cycle interval time Tn) is obtained and saved in another memory region using a memory region for saving the cycle data for the six edges occurring during previous cycles and a ring buffer structure including pointer showing a data storage position in the memory. An obtained value of the cycle interval time Tn is saved in a memory region shown by the pointer and the value of the pointer is renewed to show the next data. By this operation, data in the memory is not required to be moved, which further reduces the load during calculation operation.

In Step S107, fluctuation of cycle interval time Tn is examined. It is determined that the motor rotational speed, which is a reciprocal of cycle is increasing when the cycle interval time Tn is shorter than the previous cycle. On the other hand, when the cycle interval time Tn is longer than the duration of the previous cycle, it is judged that the motor rotational speed is reduced. Because the motor rotational speed is reduced when the entrapment condition occurs, it is more effective to carry out the entrapment detection transaction only when the motor rotation is reduced. Accordingly, The process for calculating an entrapment cycle coefficient value can be separated into two parts following the fluctuation of the cycle interval time Tn when the calculation is performed during increased motor rotational speed. One is a process for performing cycle coefficient calculation. The other is a process for actually confirming the detection of the entrapment. This reduces the transaction time of one main routine. In the first embodiment of the present invention, the fluctuation of the cycle internal time Tn is determined by comparing the duration between the cycle interval time Tn and the cycle six edges during Tn−6. When Tn−6 is greater than Tn, the transaction is advanced to Step S108. When Tn is equal to or greater than Tn−6, the transaction is advanced to Step S110.

In Step S108 (in FIG. 4c))(that is when Tn−6 is greater than Tn), the value of the cycle interval time Tn is predetermined as standard cycle Tb to be saved in the memory. During the time when each cycle is getting short (that is during the motor rotational speed is increasing), the value of the standard cycle time Tb is successively renewed. In Step S109, a cycle coefficient Cb, necessary for obtaining the non-detecting cycle Tb/Cb is calculated based on the value of the standard cycle Tb. The following formula is therefore established: Cb=1−Rdet·Tb.

In this case, Rdet corresponds to motor rotational speed fluctuation amount corresponding to the entrapment detection load (motor generated torque corresponding to an entrapment condition. After calculating Cb in Step S109, the operation is advanced to Step S121.

Thus, in the process for reducing the cycle width, the standard cycle Tb is determined lo and the value of the Cb is calculated after Step S109 to advance to Step S121. However, in the process for transaction from Step S108 to Step S109, it is not necessary to detect the entrapment, and thus the comparison transaction for the entrapment is not performed.

In Step S110 (in FIG. 4(b)), the comparison operation is performed by using the cycle coefficient Cb calculated in Step S109, the standard cycle duration Tb determined in Step S108, and the cycle interval time Tn obtained at Step S106. It is judged that entrapment occurs when the value of the cycle interval time Tn is greater than the value of the non-detecting cycle Tb/Cb. In order to avoid the division operation in the calculation of the non-detecting cycle Tb/Cb, the occurrence of the entrapment is determined when the calculated value of Tn·Cb is greater than the value of Tb. Thus, by comparing the value of Tn·Cb and the value of Tb which includes a multiplication by Cb, no division operation is necessary and the transaction time necessary for determining the entrapment is shortened compared with an operation including division even if a multiple-stage arithmetic operation is performed using less a expensive CPU with a low transaction capability. Accordingly, a highly accurate entrapment detection determination can be achieved using a CPU with lower transaction capability. In addition, when the time required for entrapment determination becomes shorter, the increase of the entrapment load can be restrained.

When the occurrence of an entrapment condition is determined in Step S110, the process advances to Step S112. When an occurrence of entrapment is not determined, the process advances to Step S111. In Step S111, a counter value for counting the number of successive entrapment occurrences, to avoid misjudging entrapment at every edge detection of the pulse signal, is cleared. Then, the transaction is advanced to Step S121. In an occurrence of entrapment is determined in Step S110, the successive entrapment detection number is increased by one in Step S112.

In Step S113 (FIG. 4(c)), it is judged whether the counter value of the successive entrapment detection number is greater than a predetermined number (e.g., two entrapment occurrences). When the successive entrapment detection number is greater than the predetermined number, the entrapment detection is confirmed. When the entrapment detection is not confirmed, the process advances to Step S121, otherwise it advances to Step S114. In Step S114, the signal for turning off the relay 6 for motor actuation is outputted in order to stop the operation of the motor 2 for actuating the roof pane 22 as a result of the entrapment detection confirmation. A flag confirming an entrapment detection for use in operational transactions for controlling the roof pane 22 is also setup. In Step S121, referring to the flag, the operation of the roof pane 22 in closing direction is immediately stopped when the entrapment detection is confirmed and the roof pane 22 is moved in reverse direction (e.g., the roof pane 22 is reversed by 200 mm from the position where the entrapment is detected).

Referring now to FIG. 5, in Step S115, a passage of time Te from the latest edge of the last detected pulse signal to the present is obtained. The value of the passage of time Te corresponds to the passage of time from the generation of the either rising or falling edge of the last pulse signal in the current main routine. In practice, a timer is used for measuring cycle during (obtaining Te) which is saved in the RAM. In Step S116, using the cycle coefficient Cb, the standard cycle Tb and the value of Te, the entrapment detection is determined by comparing the calculated value of Cb·Te and Tb. The entrapment detection is judged when the value of the passage of time Te from the last detected edge is greater than the value of the non-detecting cycle Tb/Cb. In actual operation, the differential between Te and Tb/Cb is determined by comparison of the value of Cb·Te and the value of Tb. When the occurrence of an entrapment condition is determined using the formula of Step S116, the process advances to Step S120 and an operation similar to Step S114 is performed. When entrapment is not judged, the operation advances to Step S117.

In Step S117, a time Tp corresponding to a period from a signal edge detected several pulses before (e.g., two pulses) to the present is obtained. For example, the value of Tp, the passage of time from a prior predetermined pulse (i.e., two edges before) to the present, when the edge of the pulse signal to be detected is generated at the beginning of the current main routine. In practice, by adding the edge width previously obtained at the generation of last edge (i.e., the previous value of Te) and the current value of Te, the value of Tp is calculated and saved in the RAM.

After Step S117, the entrapment detection determination is made using a formula similar to the formula used in Step S110 (by comparing Cb·Te and Th using the cycle coefficient Cb), including the standard cycle Tb and Tp. In Step S118, in the case when entrapment has not occurred (i.e., when Cb·Te is equal to or less than Tb), the comparison operation of the entrapment detection is completed and the process advances to Step S121. When an entrapment condition has occurred (i.e., Cb·Te is greater than Tb), the process advances to Step S119, to confirm the detection number.

In Step S119, when an entrapment condition has been detected a predetermined conseqvtive (continuous) number of times (n−1), the process advances to Step S120. When the predetermined number of continuous entrapments has not been detected (n−1) times, the entrapment detection operation advances to Step S121. In Step S120, in order to stop the motor 2 as a result of the detection confirmation result, the signal is output to turn off the relay 6 for actuating motor. A flag showing the entrapment detection confirmation for the operational control of the roof pane 22 is saved on RAM. When a sudden rotational speed fluctuation is generated, the input interval of the pulse signal edge is suddenly widened. In this case, by determining that the duration of Tp and Te corresponding to the present cycle time exceed (substantial constant torque) the non-detecting cycle time, the entrapment determination can be performed under a stable load.

In Step S121, (FIG. 4(c)) the operation of the roof pane 22 is determined based on the input pulse signal and an output information from the motor 2 to the relay 6, which is stored on the RAM. For example, when the opening/closing switch 8a is moved to the opening position, the roof pane 22 is moved in the opening direction and when the opening/closing switch 8a is moved to the closing position, the roof pane 22 is operated in closing direction. When the entrapment detection confirmation is performed according to the entrapment detection determination routine, the operation of the roof pane 22 in closing direction is immediately stopped and operated in the reverse direction by 200 mm. In practice, the output from the CPU 5 is sent to the relay 6 to reverse the motor operation in Step S121. The output information to the relay 6 is saved in the RAM. Then, in Step S122 the output of the relay 6 for actuating the motor 2 using the output information on RAM is performed. The foregoing process as shown from Step S102 to Step S112 is then repeated.

In the first embodiment of the present invention, the entrapment detection can be performed swiftly because it is performed only by comparing the multiplied value of the cycle interval time Tn and the cycle coefficient Cb from the non-detecting cycle Tb/Cb with Tb using the edge input of the pulse signal from the motor rotation sensor 7. Even when the edge input from the motor rotation sensor 7 does not exist during the period corresponding to the non-detecting cycle, the same level of detection accuracy can be maintained as when the edge input exist.

Because the calculation operations are developed to have high entrapment detection accuracy without using division operations in the entrapment judgment, the entrapment judgment can be performed using a relatively inexpensive CPU for CPU 5. In addition, because it is not necessary to recalculate the value of the cycle coefficient Cb, the calculation load of the CPU 5 can be reduced.

The second embodiment of the present invention will be explained as follow. The second embodiment is different from the first embodiment in that the entrapment detection judgment considers an electric voltage fluctuation (i.e., power source voltage fluctuation) of a battery BAT. As shown in FIG. 9, there is a positive correlation when the motor rotational speed is constant between the motor generated torque and the power source electric voltage (i.e., battery voltage). Accordingly, in the second embodiment, the cycle coefficient Cb of the first embodiment is changed to a cycle coefficient $Cd(\Delta V)(=\{krd-(kr \cdot Rdet-kvd \cdot \Delta V) \cdot Tb\})$ corrected considering the characteristics of the electric voltage fluctuation. The cycle coefficient $Cd(\Delta V)$ calculates the non-detecting cycle $(Tb/Cd(\Delta V))$ (refer to as formula 4).

FIG. 6 is an explanatory illustration for showing the entrapment detection judgment based on the pulse signal from the motor rotation sensor 7 of the second embodiment.

FIG. 6(*a*) illustrates a determination based on cycle data when the pulse signal output (edge change) is continuously generated from the motor rotation sensor 7. In this case, the signal cycle (latest cycle) interval time Tn of the motor rotation sensor 7 is obtained in the same manner as the first embodiment. Using the cycle interval time Tn, and the standard cycle duration Tb, the entrapment detection determination is made. In the second embodiment, as shown in FIG. 6(*a*), the occurrence of an entrapment condition is judged when the value of the cycle time Tn is greater than the value of the corrected non-detecting cycle $(Tb/Cb(\Delta V))$ based on the battery electric voltage, similar to the first embodiment.

FIG. 6(*b*) shows the cycle data when the edge change does not occur in the pulse signal being outputted from the motor rotation sensor 7. In this case, the passage of time Tp from a point two edge detections prior to the present can be obtained in the same manner as the first embodiment. The entrapment detection determination may be performed using the value of the passage of time Tp. That is, as shown in FIG. 6(*b*), the occurrence of the entrapment is determined when the value of the passage of time Tp is greater than the value of the corrected non-detecting cycle $(Tb/Cd(\Delta V))$ based on the battery voltage similar to the first embodiment. Accordingly, even when the cycle change (rotational speed change) due to sudden load change (torque change) during the operation occurs, and when the edge change of the detected pulse signal from the motor rotation sensor 7 does not occur, the entrapment detection determination can be performed relative to the corrected non-detecting cycle $(Tb/Cd(\Delta V))$ based on the battery voltage. This enables the CPU 5 to perform the entrapment detection with a stable load.

FIG. 6(*c*) illustrates a determination based on cycle data when the edge change by the pulse signal from the motor rotation sensor 7 does not occur. In this case, the passage of time Te from the last detected edge to the present can be obtained in the same manner as the first embodiment. The entrapment detection determination is performed using the value of the passage of time Te. That is, as shown in FIG. 6(*c*), the occurrence of the entrapment condition is determined when the value of Tp corresponding to the cycle duration or the value of Te corresponding to the edge width is greater than the value of the corrected non-detecting cycle $(Tb/Cd(\Delta V))$ based on the battery voltage similar to the first embodiment. Accordingly, in the case where the edge is not detected (does not occur) from the motor rotation sensor 7, even when the entrapment detection cannot be confirmed using Tp, the entrapment detection determination can be performed using Te relative to the corrected non-detecting cycle $(Tb/Cd(\Delta V))$ based on the battery electric voltage. Thus, the entrapment detection can be performed with a stable load.

Figure 7:
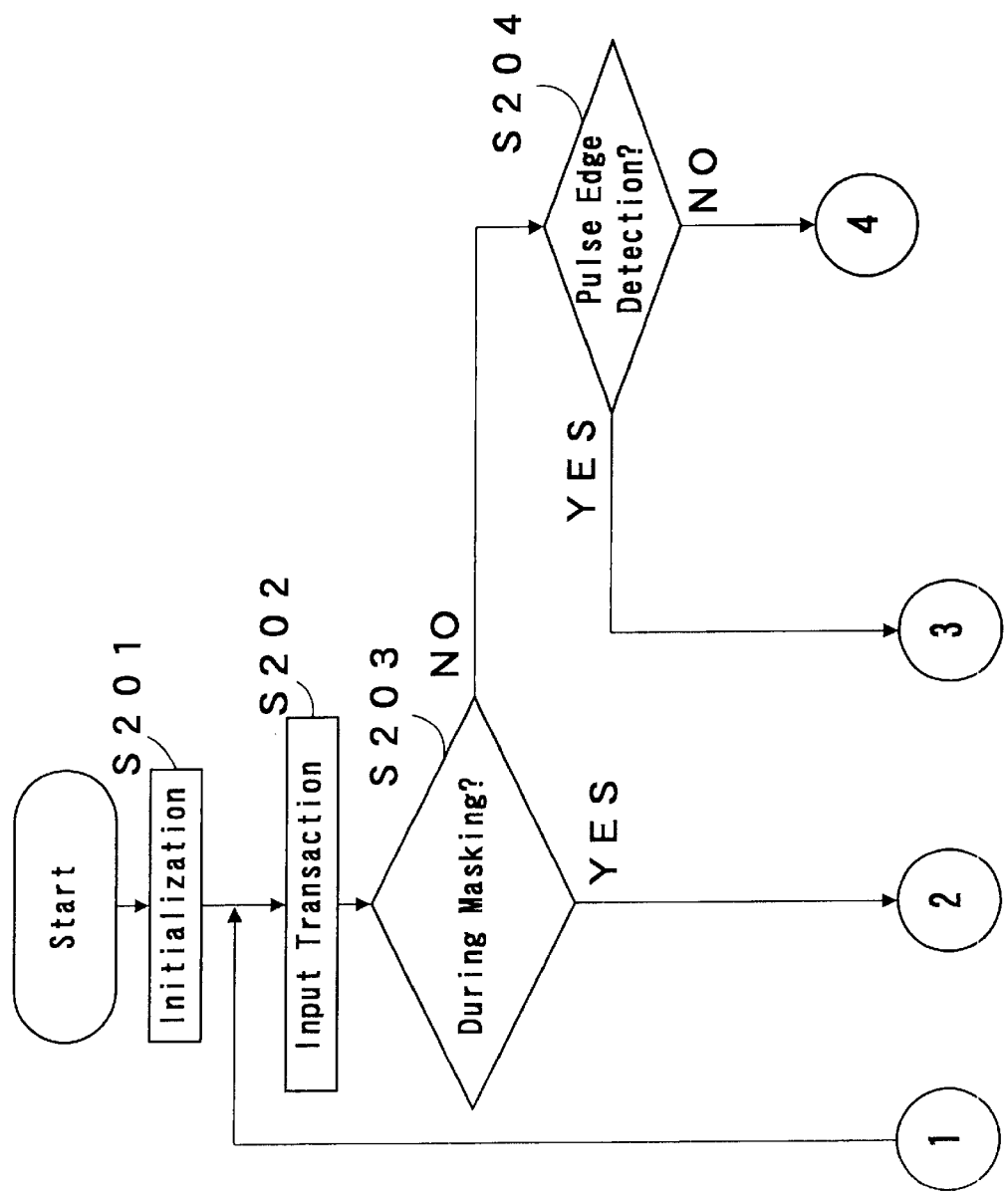
Figure 7:
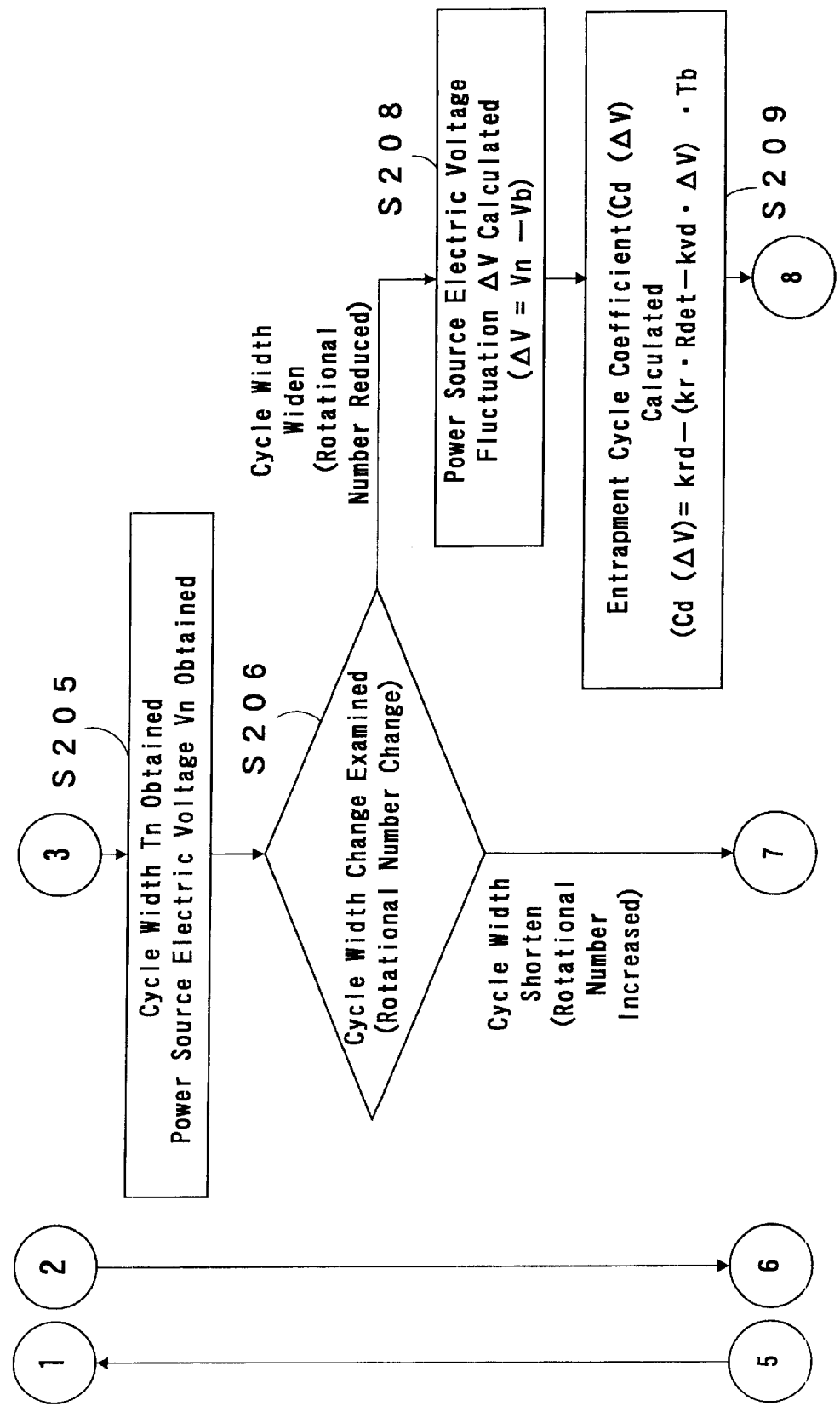

Referring to FIGS. 7 and 8, the entrapment judgment transaction of the controller 1 according to the second embodiment will be explained. In Step S201, the sunroof device 10 is initialized as in the first embodiment. Process operations from Step S202 to Step S224 will be referred to as a main routine, which is carried out during a predetermined cycle.

In Step S202, input pulse signals from the rotation sensor 7, the opening/closing operational switch 8*a* and the position detection switch 8*b*, are inputted into the CPU 5. The signals inputted into the controller 1, i.e., signals from the opening/closing operational switch 8*a*, the position detection switch 8*b*, the pulse signal from the motor rotation sensor 7, and the electric voltage signal from the battery BAT, are inputted to the CPU 5 an stored in required allocated memories.

In Step S203, it is determined whether the current rotational condition of the motor 2 is stable as in the first embodiment (refer to Step S104). That is, when the motor rotation is unstable (during masking), the process advances to Step S223. When the motor rotation is stable, the process advances to Step S204 to perform the entrapment detection determination.

In Step S204, it is judged whether the edge change of the pulse signal outputted from the motor rotation sensor 7 occurs as in the first embodiment (whether the edge change is inputted into the CPU 5) (refer to Step S105). In Step S204, when the edge change (pulse edge) of the pulse signal from the motor rotation sensor 7 is detected, the process advances to Step S205. When the edge is not detected, the process advances to Step S215 of FIG. 8.

In Step S205, the cycle interval time Tn of the pulse signal from the motor rotation sensor 7 is obtained in the same manner as the first embodiment and saved in the memory (RAM). A battery voltage Vn is also obtained and saved in the memory (RAM). The battery voltage Vn is the value after AD conversion of the electric voltage signal from the battery BAT.

In Step S206, the fluctuation condition of the cycle interval time Tn is examined. When the cycle time Tn is shorter than in the previous cycle, it is determined that the motor rotational speed, which is the reciprocal of the cycle interval time is increasing, and the process advances to Step S207. On the other hand, when the cycle time Tn is longer than in the previous cycle, it is judged that the motor rotational speed is decreasing, and the process advances to Step S208.

In Step S207 (FIG. 7(*c*)), the value of the cycle interval time Tn is predetermined as the standard cycle Tb and the value of the battery electric voltage Vn is predetermined as a standard voltage Vb to be stored in the memory. When the cycle time is decresing (i.e., when the motor rotation speed increases), the values of the standard cycle Tb and the standard voltage Vb are successively renewed (updated). Although the process advances to Step S223 after Step S207, during the operation of the Step S207, the comparison operation for the entrapment detection is not performed because it is not necessary to perform the entrapment detection.

When the cycle time Tn is longer than the previous cycle in Step S206, a power source electric voltage fluctuation $\Delta V=(Vn-Vb)$ is calculated in Step S208. In Step S209, the cycle coefficient $Cd(\Delta V)$ is calculated including correction for the power source electric voltage based on the standard cycle Tb and the power source electric voltage fluctuation $\Delta V$. The cycle coefficient $Cd(\Delta V)$ is a coefficient for calculating the non-detecting cycle $(Tb/Cd(\Delta V))$ after correcting for the power source electric voltage. The following formula is, therefore, established:

$$Cd(\Delta V)=\{krd+(kr \cdot Rdet+kvd \cdot \Delta V) \cdot Tb\}$$

Rdet is a rotational speed fluctuation value corresponding to the entrapment detection load torque at a predetermined electric voltage. After $Cd(\Delta V)$ is calculated in Step S209, the process continues to Step S210.

In Step S210, the comparison operation for entrapment detection is performed using the cycle coefficient $Cd(\Delta V)$ calculated in Step S209, the standard cycle time Tb predetermined in Step S207, and the cycle interval time Tn obtained in Step S205. When the value of the cycle time Tn is greater than the non-detecting cycle $Tb/Cd(\Delta V)$, it is determined that an entrapment condition has occurred. In this case, to avoid using a division operation for calculating the non-detecting cycle $Tb/Cd(\Delta V)$, the value of $Tn \cdot Cd(\Delta V)$ and the value of Tb which are the values of Tn and $Tb/Cd(\Delta V)$ multiplied by $Cd(\Delta V)$ are compared as in the first embodiment. When the calculated value of $Tn \cdot Cd(\Delta V)$ is greater than the value of Tb, it is determined that entrapment has occurred.

When an occurrence of entrapment is judged in Step S210, the process advances to Step S212. When the occurrence of the entrapment is not judged, the process proceeds to Step S211. The counter value of the successive entrapment detection number is cleared (set to zero) and in the memory. Then the transaction is advanced to Step S223. On the other hand, in Step S212, the successive entrapment detection number is increased by one. In Step S213, it is determined whether the counter value (i.e., the successive entrapment detection number) of the successive entrapment detection number is greater than a predetermined number (e.g., two consecutive detections). When the number of entrapment detections exceeds the predetermined number, the entrapment detection is confirmed and the process proceeds to Step S214. When the entrapment detection is not confirmed, the process advances to Step S223.

In Step S214 (FIG. 7(d)), in order to stop the operation of the motor 2 (for actuating the roof pane 22), the signal for turning off the relay 6 for motor actuation is outputted as the entrapment detection confirmation result. The flag confirming the entrapment detection which is used for the operational control of the roof pane 22 is set in the memory. The flag is referred to in Step S223, and the operation of the roof pane 22 in closing direction is subsequently immediately stopped due to the entrapment detection confirmation, and the operation of the roof pane 22 is reversed. For example, the roof pane 22 is reversely operated (from the opening direction) for 200 mm from the position where the entrapment is detected.

In Step S215 of FIG. 8, the passage of time Te from the latest detected edge of the pulse signal (detected just previous to the present) is obtained as in the first embodiment and saved in the memory (RAM). The battery electric voltage Ve is also obtained and saved in the memory (RAM). The battery electric voltage Ve is the value after A/D conversion of the electric voltage signal from the battery BAT similar to the battery electric voltage Vn. Then, in Step S216, the power source electric voltage fluctuation $\Delta V=(Ve-Vb)$ is calculated. In Step S217, the cycle coefficient $Cd(\Delta V)$, including the correction for the power source voltage based on the standard cycle Tb and the power source electric voltage fluctuation $\Delta V$, is calculated as in Step S209.

In Step S218, the comparison operation of the entrapment detection determination is performed as in Step S210 using the cycle coefficient $Cd(\Delta V)$ calculated in Step S217, the standard cycle time Tb predetermined in Step S207, and the passage of time Te obtained in Step S215. When the value of the passage of time corresponding to the edge width (Te) is greater than the value of the non-detecting cycle $Tb/Cd(\Delta V)$, it is determined that an entrapment has occurred. In this case, to avoid the use of a division operation for calculating the non-detecting cycle $Tb/Cd(\Delta V)$, the value of the $Tn \cdot Cd(\Delta V)$ and the value of Tb (which are the values multiplied with the value of $Cd(\Delta V)$) are compared. When the calculated value of $Tn \cdot Cd(\Delta V)$ is greater than the value of Tb, an entrapment occurrence is judged.

When an occurrence of entrapment is judged in Step S218, the process advances to Step S222. When the occurrence of an entrapment does not occur, the process proceeds to Step S219.

In Step S219, the time Tp representing a period from a signal edge detected several pulses previous to the present point in time, to the present is obtained as in the first embodiment and is saved in the memory (RAM).

In Step S220, the entrapment detection judgment is performed using the formula shown, which is similar to the formula in Step S210 in which $Cd(\Delta V) \cdot Tp$ and Tb are compared using the values of the cycle coefficient $Cd(\Delta V)$, the standard cycle time Tb and Tp. When an entrapment has not occurred in Step S220 (i.e., when $Cd(\Delta V) \cdot Tp$ is less than Tb), the comparison operation for the entrapment detection is ended, and the process advances to Step S223. When an entrapment has occurred (i.e., $Cd(\Delta V) \cdot Tp$ is greater than Tb), the process proceeds to Step S221 to confirm the entrapment detection number.

In Step S221, when a predetermined number of successive entrapment detections has occurred, i.e., n−1, it is judged that the entrapment determination is confirmed and the process advances to Step S222. When the predetermined number has not performed n−1 successive entrapment detections, the entrapment detection operation is ended and the process continues to Step S223. In Step S222, as in Step S214, in order to stop the motor 2, the output signal for turning off the relay 6 is output as entrapment detection confirmation result. The flag showing the confirmation of the entrapment detection for the operational control of the roof pane 22 is saved in RAM. When a sudden rotational speed fluctuation occurs, the input interval of the pulse signal edge is suddenly widened. Even in such cases, an entrapment detection can be performed with a stable load by judging whether time Tp or time Te corresponding to the cycle times, exceed the non-detecting cycle time.

In Step S223 (FIG. 7(d)), the operation of the roof pane 22 is determined based on the input signals as in the first embodiment, and the output information (for operating the motor 2 for operating the roof pane 22), is sent to the relay 6 and is saved in the RAM. In Step S224, the output of the relay 6 for actuating the motor 2 is performed using the output information in RAM. The aforementioned transactions from Step S202 to Step S224 are then repeated.

According to the second embodiment, the following effects will be obtained in addition to the effects of the first embodiment.

A decline in the performance of the entrapment detection function can be avoided even when a fluctuation of the battery electric voltage (power source electric voltage) has occurred.

The operation of determining the cycle interval time Tn and the battery electric voltage Vn in accordance with the cycle width variation (rotational speed variation), the operation of calculating the cycle coefficient Cd(ΔV) and the entrapment detection determination are separated. Accordingly, the operation time for each main loop can be reduced.

The control means saves a predetermined number of pulse output charges. The standard cycle time Tb is determined from the saved pulse outputs. The cycle coefficient Cb for a non-detecting cycle is calculated based on the standard Tb. The entrapment confirmation is performed by comparing the multiplied value of the cycle coefficient Cb and the latest cycle interval time Tn (e.g., Cb·Tn) and the standard cycle time Tb. In such cases, the division operation is avoided in the entrapment determination, early (speedy) entrapment judgment may be performed, and thus, an increase of the entrapment load (motor torque) can be restrained. Further, because it is not necessary to memorize a data map in advance of the entrapment judgment, the size of the memory can be reduced.

The control means saves the output changes of the pulse output and thereby obtains the latest cycle interval time Tn. The standard time cycle Tb is predetermined from the pulse output several pulses before. The cycle coefficient Cb is calculated based on the standard cycle time Tb. The entrapment confirmation is performed when the multiplied value of the cycle coefficient Cb and the cycle time Tn (e.g., Cb·Tn) is greater than the standard cycle time Tb. Thus, the division operation can be avoided in the entrapment judgment, the early entrapment judgment can be performed with high accuracy, and the increase of the entrapment load can be restrained. Further, because it is not necessary for the control means to memorize the data map in advance when performing the entrapment judgment, the size of the memory can be further reduced.

When a current pulse output is not detected, the time width pulse output changes (edge changes) from the start of the condition to the present are calculated. An entrapment detection is performed when the multiplied value of the cycle coefficient and the present cycle time width is greater than the standard cycle width. In this case, an entrapment condition which exceeds acceptable load fluctuation due to the generation of a fluctuation of the motor rotational speed can be confirmed with a stable entrapment load, even when the pulse input does not occur, and when a sudden rotational speed change occurs during the operation of the opening/closing member By replacing the cycle coefficient Cb with the cycle coefficient Cd(ΔV) corrected in accordance with the fluctuation of the power source electric voltage, a performance decline of the entrapment detection function can be avoided when the power source electric voltage is fluctuates.

When the standard cycle is setup during an increase of the motor rotational speed, the efficient entrapment judgment equalizing the calculation load can be performed, the transaction time can be reduced, and the manufacturing cost of the control means can be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An entrapment detection device of an opening/closing member comprising:

a motor for actuating the opening/closing member;

a detecting means for outputting a pulse synchronized to movement of the motor; and a control means for performing an entrapment detection during an operation of the opening/closing member based on a change of the pulse output from the detecting means;

wherein the control means stores a predetermined number of the pulse output changes, determines a standard cycle time Tb from the stored pulse output, calculates a cycle coefficient Cb based on the standard cycle time Tb, and performs an entrapment confirmation by comparing a multiplied value of the cycle coefficient Cb and most recent cycle time Tn with the standard cycle time Tb.

2. An entrapment detection device of an opening/closing member comprising:

a motor for actuating the opening/closing member;

a detecting means for outputting a pulse synchronized to movement of the motor; and a control means for performing an entrapment detection during an operation of the opening/closing member based on a change of the pulse output from the detecting means;

wherein the control means stores a predetermined number of pulse output changes, obtains a most recent cycle time Tn, determines a standard cycle time Tb from an output pulse occurring several output pulses before a presently occurring output pulse, calculates cycle coefficient Cb based on the standard cycle time Tb, and performs an entrapment confirmation when a multiplied value of the cycle coefficient Cb and the cycle time Tn is greater than the standard cycle time Tb.

3. The entrapment detection device of an opening/closing member according to claim 2, wherein when the present output pulse is not detected by the detecting means, a cycle time width Tp is calculated by determining the duration between a preceding pulse edge occurring before a pulse output change initiating the present output pulse, and the entrapment confirmation is performed when a multiplied value of the cycle coefficient Cb and the time width Tp is greater than the standard cycle time Tb.

4. The entrapment detection device of an opening/closing member according to claim 2, wherein when the present output pulse is not detected by the detecting means, a time width Te is calculated by determining the duration between a second most recently detected pulse output edge and a point at which the entrapment detection operation is initiated, the point at which the entrapment detection operation is initiated occurring after the most recently detected pulse output edge, and the entrapment confirmation is performed when a multiplied value of the cycle coefficient Cb and the time width Te is greater than the standard cycle time Tb.

5. The entrapment detection device of an opening/closing member according to claim 2, wherein the cycle coefficient Cb is corrected in accordance with a fluctuation of a power source electric voltage.

6. The entrapment detection device of an opening/closing member according to claim 2, wherein the standard cycle time Tb is obtained when a motor rotational speed is increasing.

* * * * *